United States Patent [19]

Fleming

[11] 3,984,071

[45] Oct. 5, 1976

[54] SATELLITE NUTATION ATTENUATION APPARATUS

[75] Inventor: Alan W. Fleming, Palos Verdes Peninsula, Calif.

[73] Assignee: TRW Inc., Redondo Beach, Calif.

[22] Filed: Aug. 29, 1974

[21] Appl. No.: 501,545

[52] U.S. Cl. ............................ 244/169; 235/150.2; 244/3.22
[51] Int. Cl.² .......................................... B64G 1/00
[58] Field of Search ...................... 235/150.1, 150.2; 244/3.21, 3.22, 77 SS, 77 DZ, 169, 170; 318/585, 586, 624; 73/178 R

[56] References Cited
UNITED STATES PATENTS

| | | | |
|---|---|---|---|
| 3,437,288 | 4/1969 | Domaulam...................... | 244/3.22 X |
| 3,547,381 | 12/1970 | Shaw et al. ...................... | 244/169 X |
| 3,624,367 | 11/1971 | Hamilton et al................ | 244/3.21 X |
| 3,643,897 | 2/1972 | Johnson, Jr......................... | 244/169 |

Primary Examiner—Trygve M. Blix
Assistant Examiner—Stephen G. Kunin
Attorney, Agent, or Firm—Daniel T. Anderson; Stephen J. Koundakjian; Edwin A. Oser

[57] ABSTRACT

An active attitude control apparatus for damping roll-/yaw nutation motion within the control deadband of a satellite which is three-axis stabilized to local vertical by means of a pitch biased, body-fixed reaction wheel and offset roll-yaw thrusters. The apparatus is incorporated into a system in which large attitude motion outside the deadband is controlled by means of the offset roll/yaw control thrusters with an accompanying control mechanism for activating the thrusters in an appropriate direction when motion outside the deadband is sensed. The present apparatus includes logic circuitry apparatus to cause a second thruster activation, of the same sense, after each deadband actuated thruster firing, where such a firing in the same sense has not been triggered within a certain elapsed portion of the satellite nutation period, approximately ⅝ths of the period being preferred.

4 Claims, 4 Drawing Figures

Prior Art

SATELLITE NUTATION ATTENUATION APPARATUS

BACKGROUND OF THE INVENTION

1. Field of the Invention

This invention is an electronic apparatus for damping roll/yaw nutation within the control deadband of a satellite which is three-axis stabilized to local vertical by means of a pitch-biased, body-fixed reaction wheel and offset roll/yaw thrusters.

2. Description of Prior Art

The present invention can perhaps be best understood be reference to a typical prior art apparatus, the WHECON (WHEel CONtrol) system, described in AIAA Paper No. 68-461, "Analysis and Design of WHECON — An Attitude Control Concept" by H. J. Doherty, E. D. Scott and J. J. Rodden, given at the AIAA Second Communications Satellite Systems Conference, San Francisco, California Apr. 8–10, 1968.

Briefly, the WHECON system operates as follows:

Referring to FIG. 1 of the present drawing, we define three mutually-orthogonal "local-tangent" reference axes. This reference frame is not satellite-fixed, i.e., the orientation of any line in the satellite with respect to this reference frame changes as the instantaneous attitude of the satellite changes with respect to nominal attitude. The x-axis is parallel to the spacecraft velocity vector (again, regardless of the spacecraft orientation); the y-axis is normal to the satellite orbit plane; and the z-axis is radial to the orbit plane, i.e., it is directed toward the center of the earth.

We also define a "satellite-fixed" reference frame whose axes are aligned with the principal axes of the satellite (originating at its center of mass) and are fixed with respect to the satellite regardless of its instantaneous orientation. This satellite fixed frame is aligned with the local tangent frame, by definition, whenever the satellite attitude is nominal, i.e., where there is not roll, pitch or yaw. Under conditions of attitude error, the two reference frames will be misaligned.

The reaction wheel is mounted to the satellite so that its angular momentum vector lies along the negative fixed y-axis (pitch axis).

A condition of satellite yaw consists of angular displacement of the satellite-fixed x- and y-axes, respectively, from the local tangent x- and y-axes. Likewise, roll consists of angular displacement of the satellite-fixed y- and z-axes, respectively, from the local tangent y- and z-axes. Finally, pitch consists of angular displacement of the satellite-fixed x- and z-axes, respectively, from the local tangent x- and z-axes.

Satellite pitch motion decouples dynamically from roll/ yaw motion, and current art in reaction wheel pitch attitude control provides adequate means for controlling it. Accordingly, all subsequent discussion will relate to roll/yaw attitude motion and its control.

What constitutes satellite roll at a particular point in the earth orbit will constitute yaw ¼ revolution about the earth later. Likewise, what constitutes satellite yaw at a particular point in the earth orbit will constitute roll ¼ revolution later. These conditions will interchange every quarter revolution. It is clear, therefore, that a roll sensor (e.g., an ordinary horizon sensor) can be used as a basis for detection and control of both roll and yaw. Satellite roll/yaw attitude motion consists of two quasi-periodic components — one (precession) at a low frequency of approximately orbit rate and the other (nutation) at a much higher frequency, related to the satellite inertia properties and angular momentum of the reaction wheel. In the absence of any attitude control, the total satellite angular momentum vector will rotate in a "coning" fashion at nutation frequency about an apex axis which moves, with respect to the local tangent y-axis, with a combination of constant, secular (i.e., linear in time), and orbit rate motion. The magnitudes of the various components depend on the magnitudes of external torques, such as solar radiation, atmospheric drag, and meteorite collisions. Since this attitude motion represents misalignment of the satellite-fixed frame with respect to the local tangent reference frame, some means must be provided for controlling the motion to force the satellite frame to realign with the local tangent frame.

In the WHECON system this is accomplished by means of an opposed pair of thrusters whose line of thrust is parallel to the satellite-fixed y-axis and, as shown in FIG. 1, offset from the z-axis by an angle $\alpha$. Because of this offset, activation of either of the thrusters will create simultaneous roll and yaw torques on the satellite. This, together with the natural gyroscopic coupling of roll and yaw, makes it possible to control both roll and yaw with a single roll error actuated pulse modulating controller.

A "derived rate" modulation controller circuit which may be used in connection with the WHECON system is shown in FIG. 2. Here the error signal from the horizon sensor 18 is passed through a low-pass filter 20 to remove high frequency sensor noise. The filtered signal is passed through a summing junction 25 where it is broken into two branches.

One branch is fed into a positive 2-state switch with hysteresis, i.e., a "Schmitt trigger", 30P, which is activated if the filtered error signal is sufficiently positive, indicating out-of-deadband roll/yaw attitude; the other is fed into a negative Schmitt trigger 30N which is activated if the signal is sufficiently negative. The positive Schmitt trigger, while open, activates a one-shot multivibrator 35P, and the output of the multivibrator is gated together with the Schmitt trigger output to operate the negative thruster valve 40N. The same final signal is passed through another summing junction 45 to the integrator 50, whose output is fed into the first summing junction 25. When the integrator has accumulated a large enough value to indicate that the negative thruster valve has been operating a sufficient time to correct the roll error by returning the roll/yaw attitude to the deadband, the output of the integrator will counterbalance the input from the horizon (roll attitude error) sensor and deactivate the positive Schmitt trigger 30P which will, in turn, deactivate the negative thruster 40N.

The lower loop of the circuit shown in FIG. 2, which is utilized to correct a negative roll attitude error by operating the positive thruster valve 40P, is entirely similar in operation to the upper loop.

The expressions shown within the filter 20 and the integrator 50, represent, respectively, Laplace transforms of the filter transfer function and feedback integrator. The values of the parameters to be used depend on the vehicle characteristics and performance requirements, and are readily determined by one skilled in the art, for example, by following the guidelines set forth in Section IV (Design Methodology), "Precision Attitude Control with a Single Body-Fixed Momentum Wheel", R. P. Iwens, A. W. Fleming, V. A. Spector, Paper No.

74-894, AIAA Mechanics and Control of Flight Conference, Aug. 1974.

The object of the control circuit is to operate the proper thruster so that its operation, in conjunction with the gyroscopic nature of the reaction wheel 10 and the dynamics of the satellite as it orbits the earth, will eliminate roll and/or yaw errors by causing the orientation of the satellite to return within the roll attitude deadband. The deadband is an angle, calculated according to the orientation accuracy requirements of the particular satellite, representing the range from the nominal within which the roll/yaw attitude of the satellite may vary without the necessity of corrective action.

The WHECON system works well for stabilizing large excursions in roll error outside the controller deadband. However, for roll motion very near or within the deadband the controller will provide only very short minimum impulse pulses (determined by the time constant of the one-shot multivibrators 35P and 35N). The effective control damping produced by the feedback integrator 50 is then negligible. With the WHECON system and thrusters sized to produce satisfactory response for large attitude motions, undamped motion within the deadband will tend to develop into a hard two sided nutational limit cycle across the deadband in which the motion will "strike" one "wall" of the deadband, causing a thruster to be activated to reverse the motion; then strike the opposite wall causing the thruster of opposite sense to be activated; then return to the first wall, and so on in an oscillatory manner. This limit cycle causes many unnecessary thruster actuations and is undesirable for propellant economy and thruster reliability.

SUMMARY OF THE INVENTION

Accordingly, it is an object of this invention to provide a roll sensor actuated thruster control apparatus by which deadband nutation, of a satellite having the aforementioned characteristics, can be damped without the use of auxilliary vernier thrusters or the expenditure of excessive thruster propellent.

The present invention employs means responsive to a roll attitude orientation error signal, which indicates an out-of-deadband condition, for initiating and controlling the duration of operation of a thruster of proper orientation to cause the roll orientation to return to the deadband. The circuit further includes retriggerable counter means, responsive to the means for initiating and controlling thruster operation, which retriggerable counter means is adapted to initiate a single pulse operation of the thruster last actuated if the same thruster has not been activated within a preselected duration of the satellite nutation period, preferably approximately ⅝ of the period.

DESCRIPTION OF THE PREFERRED EMBODIMENT

Figure 1:
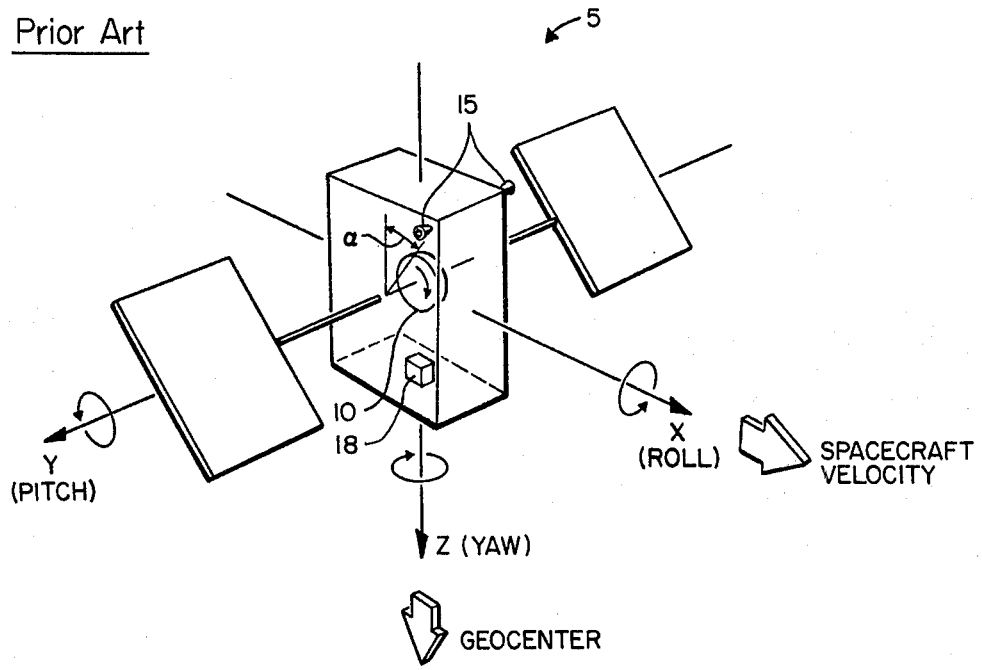
FIG. 1 is a schematic representation of a satellite which is three-axis stabilized by means of a pitch biased, body-fixed reaction wheel.
Figure 1:
Figure 2:
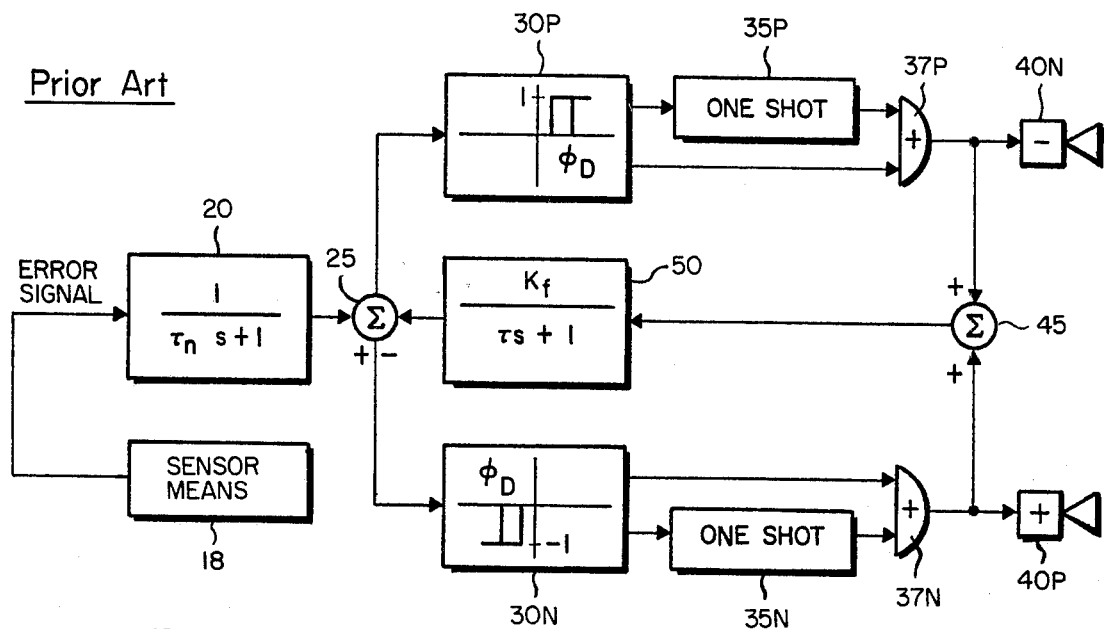
FIG. 2 is a schematic diagram of an embodiment of the thruster valve control circuit according to the WHECON control system.

Referring again to FIG. 1, the satellite 5 of the present invention is three-axis stabilized by means of a body-fixed pitch biased single gimbal reaction wheel 10. Under nominal conditions, the satellite is oriented as shown in the figure having its local tangent coordinate system and satellite-fixed coordinate system superimposed.

A pair of opposed thrusters 15 is provided for attitude correction. The two thrusters share a single thrust axis which is parallel to the satellite-fixed pitch axis and offset from the satellite-fixed yaw axis by an angle $\alpha$, selected as in the aforementioned WHECON system.

The attitude deadband, $\phi_D$, is selected by the practioner according to the pointing accuracy of the particular satellite. As described above, a roll/yaw attitude error which causes the satellite to drift outside the deadband may be corrected by selectively firing a thruster to create a torque on the satellite which returns its attitude to the deadband. In the present invention this is accomplished by sensing the roll/yaw attitude error and firing a thruster of appropriate sense in a series of pulses until a feedback loop "detriggers" the thruster by sensing that the satellite attitude is within the deadband.

However, the present invention further includes circuitry means to insure that once within the deadband the satellite nutation will self-damp.

Figure 3:
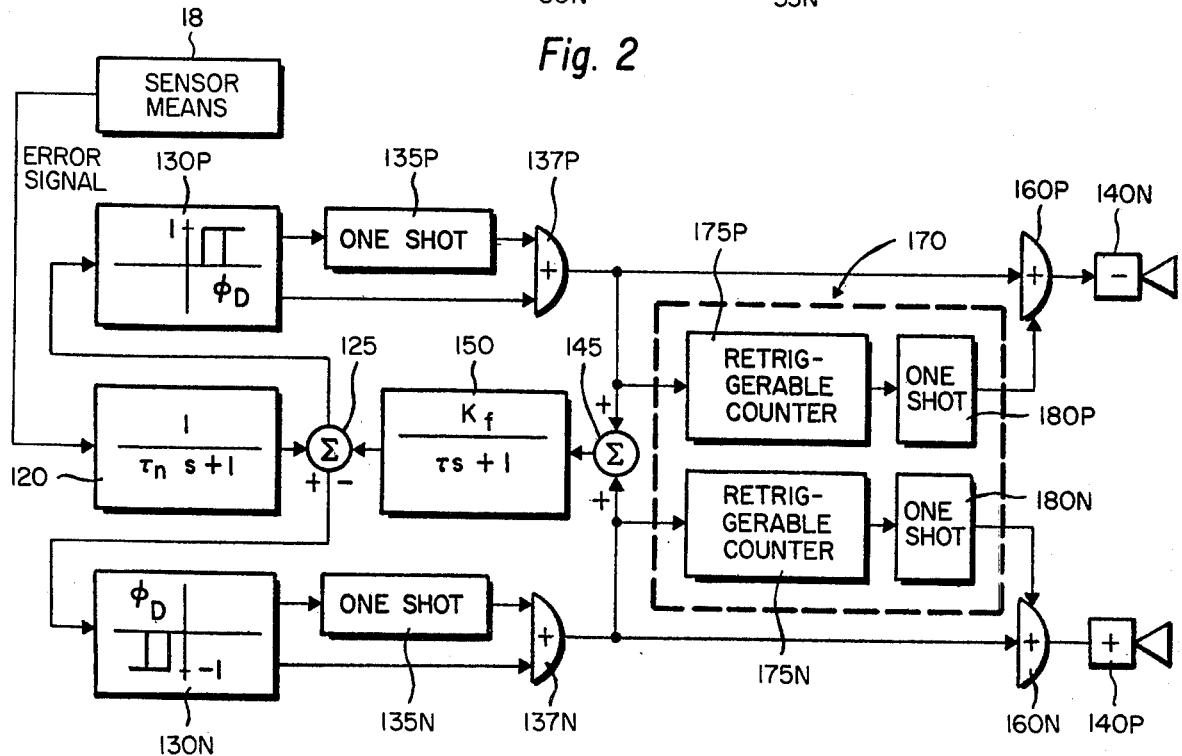
FIG. 3 is a schematic diagram of a thruster valve control circuit according to the preferred embodiment of the present invention.

Referring to FIG. 3, the thruster control apparatus of the present invention, like the aforementioned WHECON system, utilizes a roll error signal from a conventional horizon sensor. The roll attitude error signal is passed through a conventional electronic filter 120 adapted to remove the high frequency noise commonly associated with horizon sensor outputs. The filtered signal is passed through a summing junction 125, where it is broken into two branches.

The first branch enters a Schmitt trigger 130P which is activated if the error signal indicates a "positive" (defined arbitrarily, but consistently) roll/yaw attitude error. One output from the Schmitt trigger is fed into a one-shot multivibrator 135P which is adapted to generate a pulse when triggered. The other output from the Schmitt trigger is gated together from the one-shot multi-vibrator output by means of OR gate 137P. The pulse is fed through another OR gate 160P and activates the negative thruster 140N whose purpose is to counteract the positive attitude error.

The purpose of the one-shot multivibrator 135P is to guarantee a consistent and predictable minimum pulse length for small input error signals independent of the trigger and feedback integrator characteristics.

The pulse from the OR gate 137P is also fed through another summing junction 145 into an integrator 150. The purpose of the integrator is to accumulate a signal representative of the total impulse of the pulses received. The output from the integrator is fed into the initial summing junction 125 and will terminate the signal to the Schmitt trigger 130P when the accumulated signal is approximately equal in magnitude to the filtered error signal from the filter 120.

The integrator 150, Schmitt trigger 130P, and one-shot multivibrator 135P, are quite conventional and may be readily provided by a reasonably skilled electronic engineer. The values of the parameters may be selected according to current art as exemplified by the aforementioned Iwens, Fleming and Spector paper.

In the event of a negative error signal, the lower loop of the signal shown in FIG. 3 is activated. Except for the fact that the negative Schmitt trigger 130N responds to a negative input signal, the lower loop comprising the negative loop trigger 130N, the associated one-shot multivibrator 135N and OR gate 137N, together with the OR gate 160N and thruster valve 140P are entirely similar in structure and operation to the positive error signal branch just described.

The aforementioned portion of the circuit shown in FIG. 3 is equivalent to the hereinabove described WHECON system and, like the latter, is sufficient to cause the satellite roll/yaw attitude, once outside the deadband, to return to the deadband. However, as previously stated, it is not of itself entirely reliable in maintaining the attitude within the deadband without the periodic activation of first one of the thrusters and then the other in a nutation limit cycle which is uneconomical in terms of fuel expenditure.

The small oscillation nutation damping portion 170 of the circuit is provided to ensure that nutation within the deadband is self-damped.

In essence, the small oscillation portion 170 of the circuit is adapted to permit the remainder of the circuit to fire the thruster according to the aforementioned scheme whenever the error signal indicates a large (out-of-deadband) attitude error. Additionally, however, this portion of the circuit causes selective firing of the thrusters when small (barely within the deadband) attitude error is observed, the timing and sense of the secondary thruster activation being such as to cause damping of the nutation motion within the deadband. In particular, I have discovered that if a primary thruster firing of appropriate sense is made whenever the satellite roll error signal indicates out of deadband condition, and is followed by a single secondary thruster pulse of the same sense as the primary firing, which secondary pulse occurs more than one-half, but less than the full nutation cycle following that primary firing, provided that no other primary pulse of the same sense is fired in this interval, nutation within the deadband will rapidly self-damp without a large expenditure of thruster propellant. I have further discovered that this procedure is optimized if the secondary pulse occurs approximately 0.55 to 0.75 nutation cycle following the last primary thruster firing, approximately 5/8ths nutation period being preferred.

The nutation period is readily calculated from the physical parameters of the satellite itself according to the following formula:

$$T = \left\{ \frac{I_X I_Z}{[H_B - W_o(I_X - I_Y)][H_B - W_o(I_Z - I_Y)]} \right\}^{1/2},$$

where
T = nutation period (seconds)
$H_B$ = wheel momentum (foot.pound.seconds.)
$W_O$ = satellite orbital rate (radians/sec)
$I_X, I_Y, I_Z$ = principal moments of inertia along the X, Y and Z axes for the satellite mass center (slug feet$^2$)

Since the nutation period of the satellite depends on nothing other than the physical characteristics of the satellite, it may be calculated for the satellite and "hardwired" into the control circuit of the present invention. Normal variation of the physical characteristics throughout the satellite lifetime will cause nutation period variations which are well within the acceptable range for the invention.

Accordingly, it is the function of the small oscillation damping portion 170 of the circuit to cause a secondary thruster firing of the same sense as the last primary thruster firing, said secondary firing occurring approximately 5/8ths nutation cycle after the last primary thruster firing, provided there occur no further primary firings of the same sense within the timing period.

As shown in FIG. 3 in the preferred embodiment of the present invention, this feature of the circuit may be implemented most simply by a retriggerable counter one-shot multivibrator, and summing junction for each of the positive and negative channels.

Taking the negative thruster 140N as an example (the positive thruster 140P is exactly identical) each time an activation signal pulse to the negative thruster leaves the OR gate 137P to activate the negative thruster valve 140N, it also enters the retriggerable counter 175P. The retriggerable counter is reset by this pulse and begins counting until the elapsed time is the predetermined portion of the nutation period of the satellite — in the preferred embodiment, approximately 5/8ths. If the retriggerable counter has not been reset prior to reaching the predetermined point, i.e., another primary thruster pulse of the same sense has not been activated, the retriggerable counter activates the one-shot multivibrator 180P and also resets itself.

The pulse from the one-shot multivibrator 180P is directed to the OR gate 160P, causing the negative thruster valve 140N to be opened for a single-pulse secondary thruster activation.

In other words, as long as the satellite attitude is outside the deadband, and primary thruster pulses are activated by the basic circuit more frequently than the timing period to bring the attitude within the deadband, the retriggerable counter 175P continues to be reset and will not activate the one-shot multivibrator 180P. However, when the attitude is within the deadband and has been within the deadband for a set time period, (preferably 5/8ths of the satellite nutation period), the retriggerable counter will activate the one-shot multivibrator, causing a single thruster pulse of the same sense as the last primary thruster pulse.

The portion of the deadband nutation damping circuit 170 which operates the positive thruster valve 140P is entirely similar to the portion just described.

In either case, the one-shot multivibrator 180P and 180N are similar in function and construction to the one-shot multivibrator previously described. The retriggerable counters 175P and 175N merely constitute devices which are adapted to count a certain predetermined elapsed time from last input pulse and to trigger the one-shot multivibrator when this elapsed time has been reached. These are standard electronic circuit elements which can be readily obtained off-the-shelf or fabricated by a reasonably skilled electronic engineer.

Figure 4:
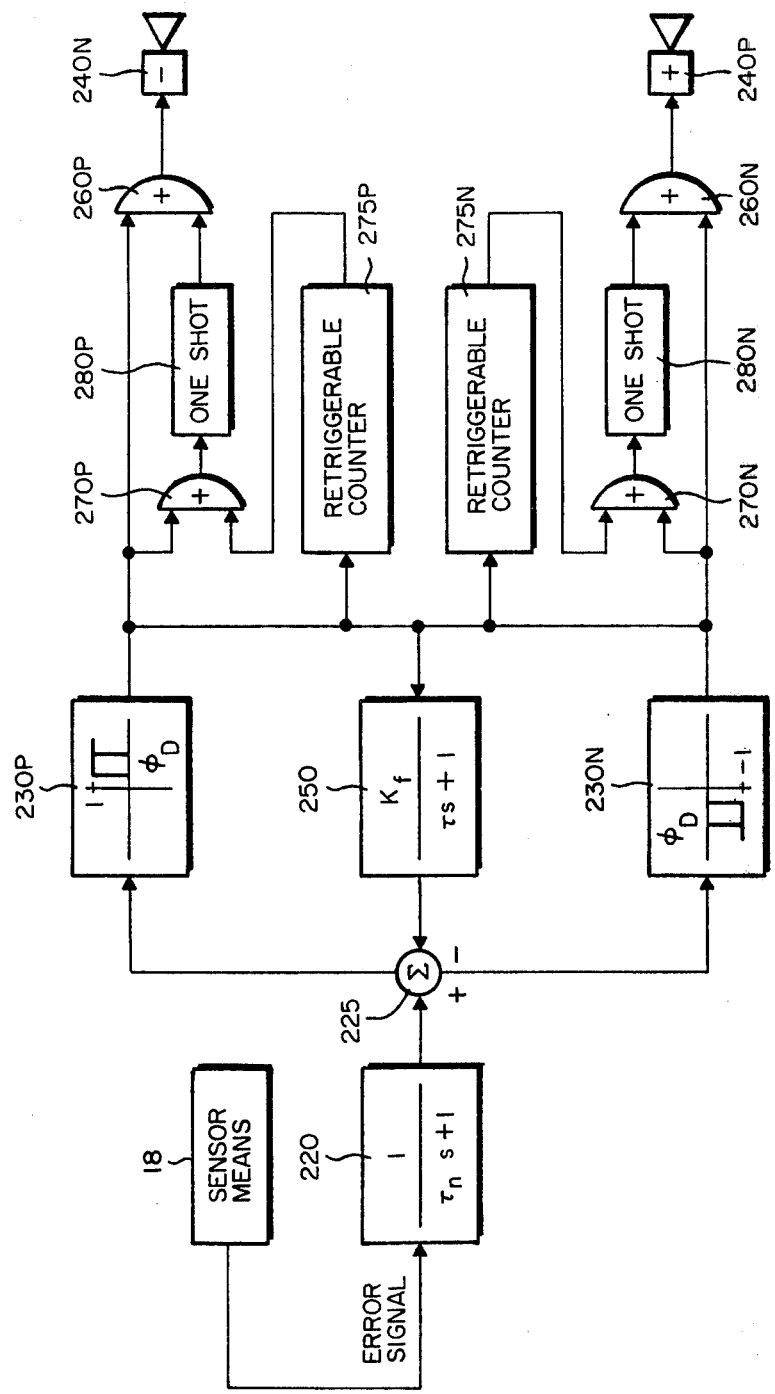
FIG. 4 is a schematic circuit diagram of an alternative embodiment of the present invention.

An alternative embodiment of the thruster control circuit of the present invention is shown in FIG. 4.

Briefly, in this embodiment of the invention, the horizon sensor error signal is sent into the low pass filter 220, the output of which is, as in the preferred embodiment, broken into two branches by a summing junction 225. Since each of the branches is identical in function, except that one responds to positive attitude errors, and the other responds to negative attitude errors, only one, the positive error branch (the upper half of a circuit shown in FIG. 4) will be described.

The error signal is fed into a positive Schmitt trigger 230P. If the trigger is activated (i.e., if the two inputs to the summing junction are unbalanced in favor of the input from the low pass filter) a pulse will be generated by the Schmitt trigger and fed through the OR gate 260P to the negative thruster valve 240N. The pulse is also fed back from the Schmitt trigger the integrator 250 which, as in the preferred embodiment, accumulates a value representative of the amount of correction (i.e., the total impulse of the pulses) which has been generated. The output from the integrator is fed to the summing junction 225 for comparison with the output from the low pass filter, to determine if sufficient error correction has been accomplished to deactivate the Schmitt trigger.

The pulse from the Schmitt trigger 230P is also fed to the retriggerable counter 275P which is reset thereby. The output from the retriggerable counter is fed, together with the output from the Schmitt trigger 230P, into the OR gate 270P. As in the preferred embodiment of the invention, if the retriggerable counter, after resetting, counts a time period equal to a certain portion of the nutation period of the satellite (more than ½ but less than the entire cycle, preferably about ⅝ths), it will activate the one-shot multivibrator 280P which will generate a secondary pulse providing it has not been reset by another primary pulse of the same sense within the timing interval. This secondary pulse is fed through the OR gate 260P for secondary activation of the negative thruster valve 240N.

Again, the lower branch of the circuit shown in FIG. 4 is identical to the upper branch except that it operates on negative attitude errors and operates the positive thruster valve 240P.

I claim:

1. In an electronic control circuit for activating positive- and negative-sense offset thrusters to provide roll and yaw attitude error correction or a satellite, said satellite having an intrinsic period of nutation and incorporating sensor means to generate an error signal representative of the amplitude and sense of satellite error, said thrusters operably coupled with said sensor means, said control circuit comprising:

first electronic means intervening between said sensor means and said thrusters and means responsive to said error signal to cause activation of the thruster of a given sense, in response to the receipt, by said first electronic means, of an error signal representing error of the opposite sense;

second electronic means responsive to the activity of said first electronic means to generate a countersignal representative of the cumulative attitude-correcting effect of said activated thruster during each activation thereof; and third electronic means responsive to said countersignal and to the error signal to prevent the operation of said first electronic means when the attitude error is within a fixed deadband, the improvement comprising fourth electronic means responsive to the activity of said first electronic means to cause a fixed length reactivation of said activated thruster, if a fixed time has elapsed from the preceding activation of said activated thruster by said first electronic means, said fixed time being less than all, but more than one-half, of the nutation period.

2. The control circuit as recited in claim 1, wherein said fixed time is more than 0.55 but less than 0.75 of the nutation period.

3. The control circuit as recited in claim 2, wherein said fixed time if ⅝ of the nutation period.

4. In an electronic control circuit for activating positive- and negative-sense offset thrusters to provide roll and yaw attitude error correction of a satellite, said satellite having an intrinsic period of nutation and incorporating sensor means to generate an error signal representative of the amplitude and sense of satellite error, said thrusters operably coupled with said sensor means, said control circuit comprising:

first electronic means intervening between said sensor means and said thrusters and means responsive to said error signal to cause activation of the thruster of a given sense, in response to the receipt, by said first electronic means, of an error signal representing error of the opposite sense;

second electronic means responsive to the activity of said first electronic means to generate a countersignal representative of the cumulative attitude-correcting effect of said activated thruster during each activation thereof; and third electronic means responsive to said countersignal and to the error signal to prevent the operation of said first electronic means when the attitude error is within a fixed deadband, the improvement comprising fourth electronic means responsive to the activity of said first electronic means to cause a fixed length of reactivation of said activated thruster, if a fixed time has elapsed from the preceding activation of said activated thruster by said first electronic means, said fixed time being less than all, but more than one-half, of the nutation period, said fourth electronic means comprising in series:

a retriggerable counter, responsive to the activity of said first electronic means; and a one-shot multivibrator, responsive to the activity of said retriggerable counter.

* * * * *